United States Patent
Agrawal et al.

(10) Patent No.: US 9,600,308 B2
(45) Date of Patent: Mar. 21, 2017

(54) VIRTUAL MACHINE MONITORING IN CLOUD INFRASTRUCTURES

(75) Inventors: Dakshi Agrawal, Monsey, NY (US); Vasileios Pappas, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 13/619,277

(22) Filed: Sep. 14, 2012

(65) Prior Publication Data

US 2014/0075013 A1    Mar. 13, 2014

Related U.S. Application Data

(63) Continuation of application No. 13/606,577, filed on Sep. 7, 2012.

(51) Int. Cl.
| | |
|---|---|
| *G06F 15/173* | (2006.01) |
| *G06F 9/455* | (2006.01) |
| *G06F 11/34* | (2006.01) |
| *H04L 12/26* | (2006.01) |

(52) U.S. Cl.
CPC ...... *G06F 9/45533* (2013.01); *G06F 9/45558* (2013.01); *G06F 11/3409* (2013.01); *G06F 11/3476* (2013.01); *G06F 11/3495* (2013.01); *H04L 43/08* (2013.01); *G06F 2009/45575* (2013.01); *G06F 2009/45591* (2013.01); *G06F 2201/815* (2013.01)

(58) Field of Classification Search
CPC .................................................. G06F 15/173
USPC ........................................................ 709/224
See application file for complete search history.

(56) References Cited

U.S. PATENT DOCUMENTS

| | | | |
|---|---|---|---|
| 8,261,269 | B2 | 9/2012 | Garmark |
| 8,307,362 | B1* | 11/2012 | Gong et al. ............ 718/1 |
| 2009/0307687 | A1 | 12/2009 | Nevarez |
| 2011/0041126 | A1 | 2/2011 | Levy |
| 2011/0072427 | A1 | 3/2011 | Garmark |
| 2011/0075674 | A1 | 3/2011 | Li |
| 2012/0311566 | A1* | 12/2012 | Takaoka ........ H04L 41/5035 718/1 |
| 2014/0006581 | A1* | 1/2014 | Raghu ............. G06F 9/5072 709/223 |
| 2015/0268977 | A1 | 9/2015 | Agrawal et al. |

OTHER PUBLICATIONS

Ciuffoletti, Augusto, "Monitoring a virtual network infrastructure," ACM SIGCOMM Computer Communication Review, vol. 40, No. 5, Oct. 2010, pp. 47-52.
U.S. Appl. No. 13/606,577 filed Sep. 7, 2012, 45 pages.
Office Action dated May 8, 2015, regarding U.S. Appl. No. 13/606,577, 24 pages.

(Continued)

*Primary Examiner* — Vivek Srivastava
*Assistant Examiner* — Sibte Bukhari
(74) *Attorney, Agent, or Firm* — Yee & Associates, P.C.; Jennifer R. Davis (57) ABSTRACT

A computer implemented method monitors resource usage of a virtual machine. When a virtual machine is instantiated, resource usage of the virtual machine is monitored to form monitoring data. The monitoring is performed externally from the virtual machine. When the virtual machine is later suspended, the monitoring data is stored as metadata associated with the virtual machine.

11 Claims, 7 Drawing Sheets

(56) References Cited

OTHER PUBLICATIONS

Final Office Action, dated Oct. 7, 2015, regarding U.S. Appl. No. 13/606,577, 17 pages.
Office Action dated Feb. 25, 2016, regarding U.S. Appl. No. 13/606,577, 16 pages.
Final Office Action, dated Jun. 3, 2016, regarding U.S. Appl. No. 13/606,577, 17 pages.
Office Action dated Aug. 19, 2016, regarding U.S. Appl. No. 13/606,577, 22 pages.
Notice of Allowance, dated Nov. 18, 2016, regarding U.S. Appl. No. 13/606,577, 12 pages.

* cited by examiner

VIRTUAL MACHINE MONITORING IN CLOUD INFRASTRUCTURES

This application is a continuation of U.S. patent application Ser. No. 13/606,577 filed Sep. 7, 2012, status pending.

This invention was made with Government support under Contract No. 60NANB10D003 awarded by Defense Advanced Research Projects Agency (DARPA). The Government has certain rights in the invention.

BACKGROUND

1. Field

The disclosure relates generally to a computer implemented method, computer system, and computer program product for monitoring resource usage. More specifically, the disclosure relates to a computer implemented method for monitoring resource usage in a cloud computing environment.

2. Description of the Related Art

Cloud computing is a model of service delivery for enabling convenient, on-demand network access to a shared pool of configurable computing resources that can be rapidly provisioned and released with minimal management effort or interaction with a provider of the service. For example, cloud computing allows a consumer to obtain data processing resources, such as networks, network bandwidth, servers, processing, memory, storage, applications, virtual machines, and services as a service on a temporary basis when needed. Several vendors are currently offering various cloud services. For example, such services include infrastructure as a service, platform as a service, storage as a service, software as a service, and business process as a service cloud services. These services use vendor-specific service request, access, and consumption models.

A consumer of cloud computing services may have its own data processing system resources. For example, the consumer may be a business or other entity. The consumer may have invested in its own data processing system resources. These resources may include a computer network. The consumer's computer network provides a limited amount of processing capability and data storage resources. The consumer's computer network also provides specific data processing applications. The consumer's computer network may be located on-premise and may be operated as a private cloud.

At certain times, the consumer may require data processing resources beyond those available in its computer network. For example, at certain times, the demand for data processing resources may outstrip the capability of the consumer's computer network. At these times, the response time of the consumer's computer network for some applications may increase to unacceptable levels. At other times, the consumer may require data processing applications that are not available on the consumer's own computer network. For example, the consumer may require, at times, the use of data processing applications that are not part of the consumer's core competency.

At those times when the consumer requires data processing resources beyond its own, the consumer may purchase such resources as a service on a temporary basis from a provider of cloud computing services. For example, the consumer may obtain additional processing or storage resources or specific application functionality as a service on a temporary basis from the cloud computing provider's data processing resources. Different types of service offerings may provide parts of the solution used in processing the consumer's workload. The provider's available data processing resources is known as a public cloud.

The consumer typically continues to operate its own computer network while some data processing resources are being obtained from a public cloud. Thus, data processing resources from the public cloud typically are obtained in order to supplement the data processing resources of the consumer's own private cloud at certain times of need. The simultaneous and coordinated operation of data processing resources from multiple clouds may be referred to as hybrid cloud computing. For example, operation of the consumer's private cloud along with resources obtained from one or more public clouds is a specific example of hybrid cloud computing.

SUMMARY

The illustrative embodiments of the present invention provide a computer implemented method for monitoring resource usage of a virtual machine. When a virtual machine is instantiated, resource usage of the virtual machine is monitored to form monitoring data. The monitoring is performed externally from the virtual machine. When the virtual machine is later suspended, the monitoring data is stored as metadata associated with the virtual machine.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, the illustrative embodiments are capable of being implemented in conjunction with any other type of computing environment now known or later developed.

For convenience, the detailed description includes the following definitions which have been derived from the "Draft NIST Working Definition of Cloud Computing" by Peter Mell and Tim Grance, dated Oct. 8, 2009.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases, automatically to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or consumer-acquired applications created using programming languages and tools supported by the provider. The consumer does not manage or control the underlying cloud infrastructure including networks, servers, operating systems, or storage but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds) and service interoperability.

A cloud computing environment is service oriented with a focus on statelessness, low coupling, modularity, and semantic interoperability. At the heart of cloud computing is an infrastructure comprising a network of interconnected nodes.

Figure 1:
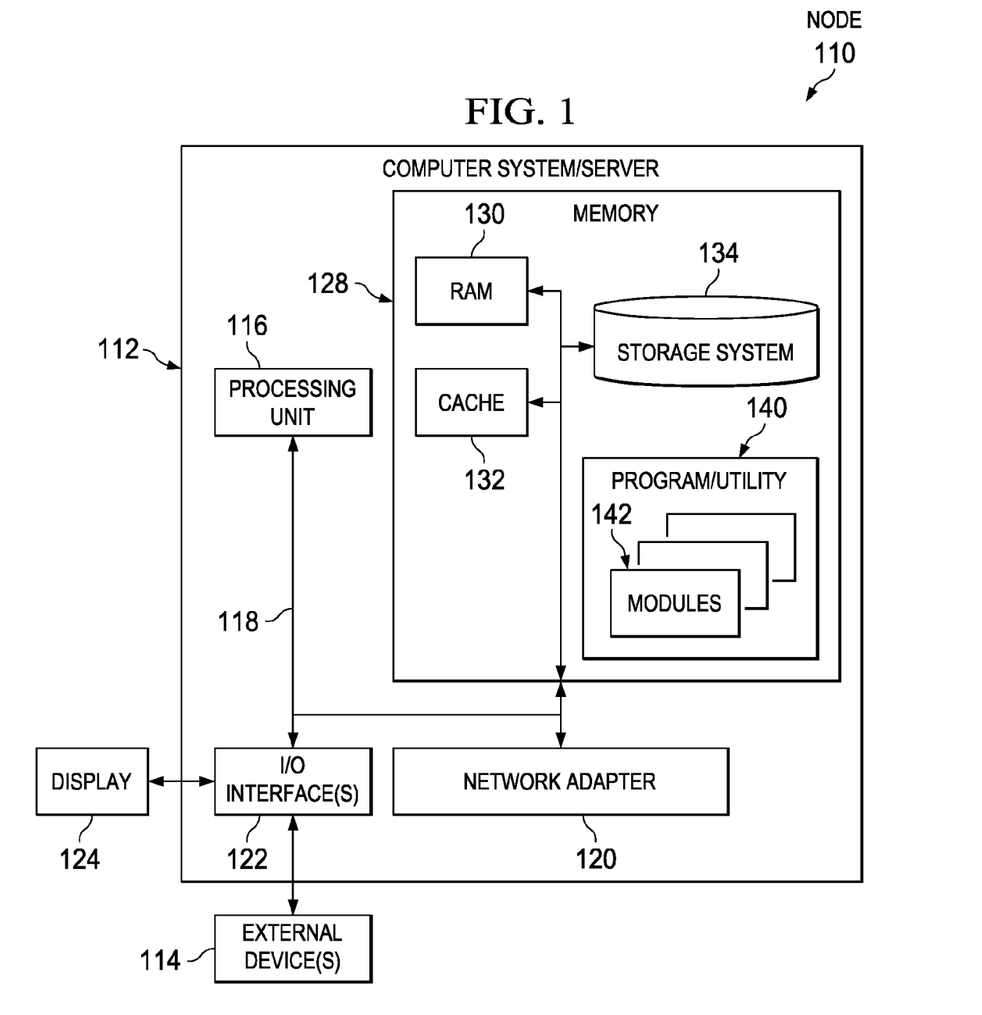
FIG. 1 is a schematic of an example of a cloud computing node depicted in accordance with an illustrative embodiment.

Referring now to FIG. 1, a schematic of an example of a cloud computing node is depicted in accordance with an illustrative embodiment. Cloud computing node 110 is only one example of a suitable cloud computing node and is not intended to suggest any limitation as to the scope of use or functionality of the illustrative embodiments described herein. Regardless, cloud computing node 110 is capable of being implemented and/or performing any of the functionality set forth hereinabove.

In cloud computing node 110 there is computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices and the like.

Computer system/server 112 may be described in the general context of computer system executable instructions, such as program modules being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 110 is shown in the form of a general purpose computing device. The components of computer system/server 112 may include, but are not limited to, one or more processors or processor unit 116, system memory 128, and bus 118 that couples various system components including system memory 128 to processor unit 116.

Processor unit 116 executes instructions for software that may be loaded into system memory 128. Processor unit 116 may be a number of processors, a multi-processor core, or some other type of processor, depending on the particular implementation. A number, as used herein with reference to an item, means one or more items. Further, processor unit 116 may be implemented using a number of heterogeneous processor systems in which a main processor is present with secondary processors on a single chip. As another illustrative example, processor unit 116 may be a symmetric multi-processor system containing multiple processors of the same type.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112 and it includes volatile media, non-volatile media, removable media, and non-removable media.

System memory 128 can include computer system readable media in the form of volatile memory, such as random access memory (RAM) 130 and/or cache memory 132. Computer system/server 112 may further include other removable/non-removable and volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the illustrative embodiments.

Program/utility 140, having a set (at least one) of program modules 142, may be stored in memory 128 by way of example and not limitation, as well as an operating system, one or more application programs, other program modules, and program data. Each of the operating systems, one or more application programs, other program modules, and program data or some combination thereof, may include an implementation of a networking environment. Program modules 142 generally carry out the functions and/or methodologies of the illustrative embodiments as described herein.

Computer system/server 112 may also communicate with one or more external devices 114, such as a keyboard, a pointing device, display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks, such as a local area network (LAN), a general wide area network (WAN), and/or a public network (e.g., the Internet) via network adapter 120. As depicted, network adapter 120 communicates with the other components of computer system/server 112 via bus 118. It should be understood that, although not shown, other hardware and/or software components could be used in conjunction with computer system/server 112. Examples include, but are not limited to, microcode, device drivers, redundant processor units, external disk drive arrays, RAID systems, tape drives, and data archival storage systems, etc.

Figure 2:
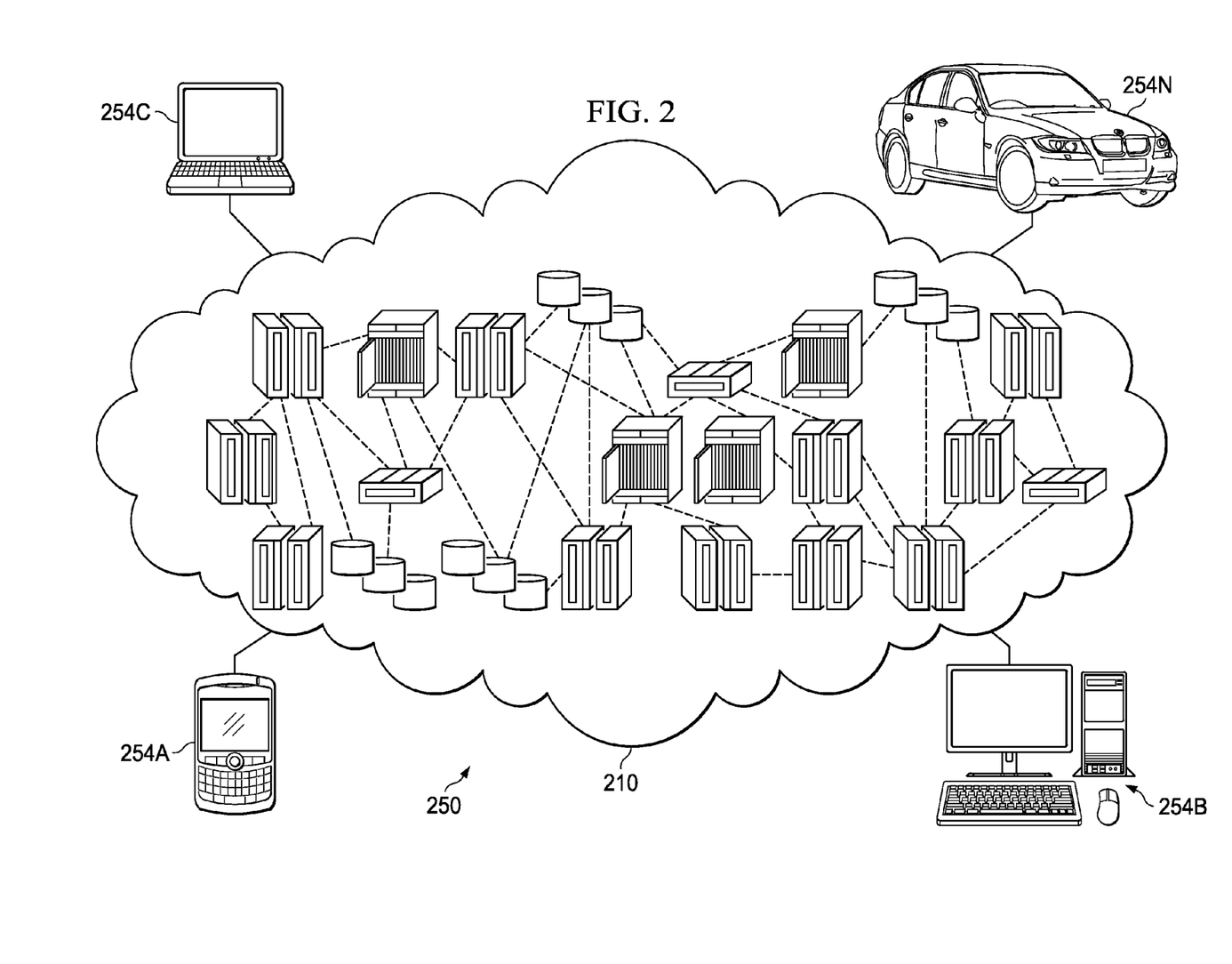
FIG. 2 is an illustration of a cloud computing environment depicted in accordance with an illustrative embodiment.

Referring now to FIG. 2, an illustration of a cloud computing environment is depicted in accordance with an illustrative embodiment. In this illustrative example, cloud computing environment 250 comprises one or more cloud computing nodes 210 with which local computing devices used by cloud consumers may communicate. For example, cloud computing node 110 in FIG. 1 is one example of cloud computing nodes 210. Local computing devices which may communicate with cloud computing nodes 210 may include, for example, personal digital assistant (PDA) or cellular telephone 254A, desktop computer 254B, laptop computer 254C, and/or automobile computer system 254N. Cloud computing nodes 210 may communicate with one another. They may be grouped (not shown) physically or virtually, in one or more networks, such as private, community, public, or hybrid clouds as described hereinabove or a combination thereof. This allows cloud computing environment 250 to offer infrastructure, platforms, and/or software as services for which a cloud consumer does not need to maintain resources on a local computing device. It is understood that the types of computing devices, for example, personal digital assistant (PDA) or cellular telephone 254A, desktop computer 254B, laptop computer 254C, and/or automobile computer system 254N shown in FIG. 2 are intended to be illustrative only and that cloud computing nodes 210 and cloud computing environment 250 can communicate with any type of computerized device over any type of network and/or network addressable connection (e.g., using a web browser). Program code located on one of cloud computing nodes 210 may be stored on a computer recordable storage medium in one of cloud computing nodes 210 and downloaded to a computing device within computing devices, for example, personal digital assistant (PDA) or cellular telephone 254A, desktop computer 254B, laptop computer 254C, and/or automobile computer system 254N over a network for use in these computing devices. For example, a server computer in cloud computing nodes 210 may store program code on a computer readable storage medium on the server computer. The server computer may download the program code to a client computer in computing devices, for example, personal digital assistant (PDA) or cellular telephone 254A, desktop computer 254B, laptop computer 254C, and/or automobile computer system 254N for use on the client computer.

Figure 3:
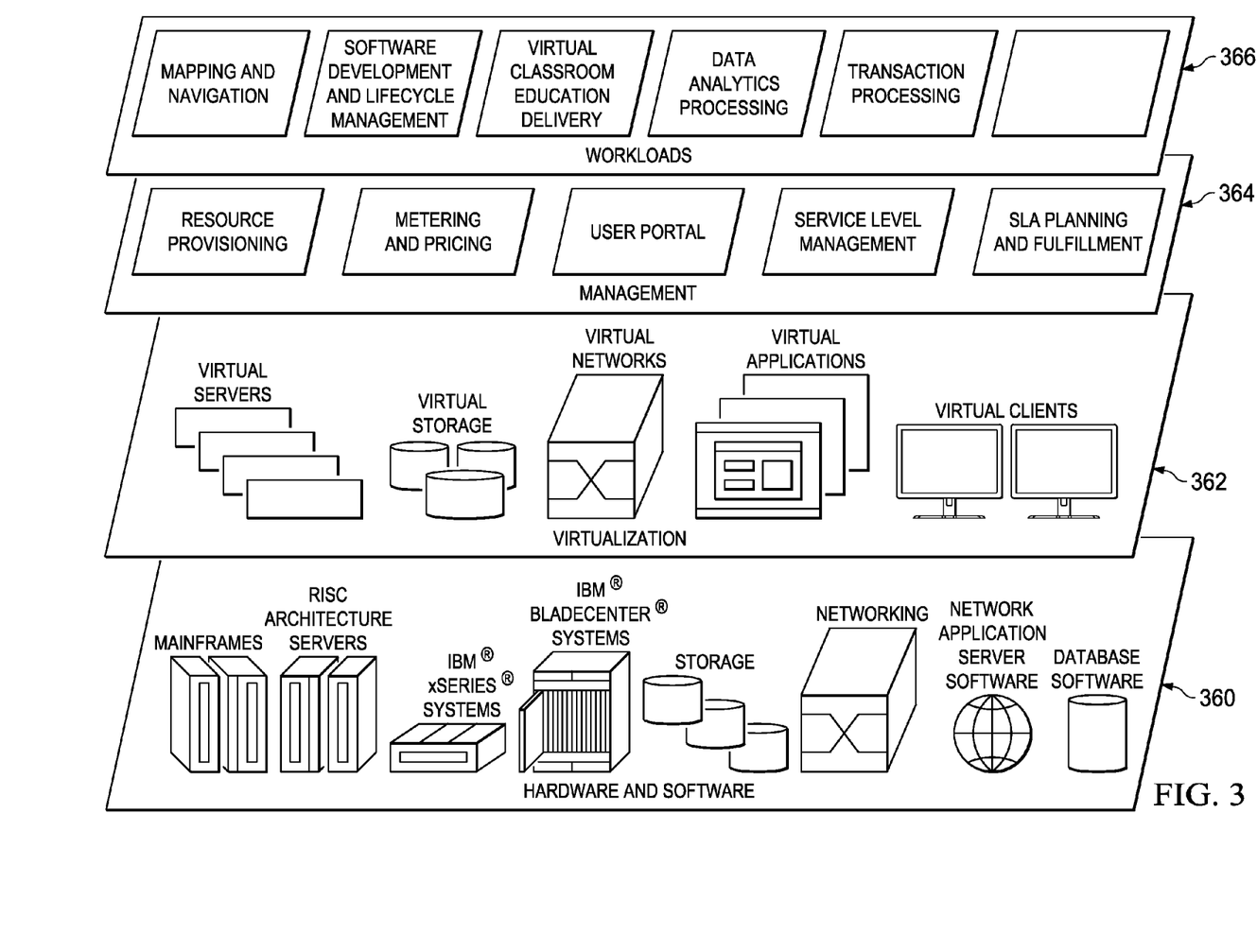
FIG. 3 is a set of functional abstraction layers depicted in accordance with an illustrative embodiment.

Referring now to FIG. 3, a set of functional abstraction layers is depicted in accordance with an illustrative embodiment. The set of functional abstraction layers may be provided by cloud computing environment 250 in FIG. 2. It should be understood in advance that the components, layers, and functions shown in FIG. 3 are intended to be illustrative only and illustrative embodiments are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® WebSphere® application server software; and database software, in one example IBM® DB2® database software. (IBM®, zSeries®, pSeries®, xSeries®, BladeCenter®, WebSphere®, and DB2® are trademarks of International Business Machines Corporation registered in many jurisdictions worldwide)

Virtualization layer 362 provides an abstraction layer from which the following examples of virtual entities may be provided: virtual servers; virtual storage; virtual networks including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and pricing provide usage and cost tracking as resources are utilized within the cloud computing environment and billing or invoicing for consumption of these resources. In one example, these resources may comprise application software licenses. Security provides identity verification for cloud consumers and tasks as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 366 provides examples of functionality for which the cloud computing environment may be utilized.

Examples of workloads and functions which may be provided from this layer include: mapping and navigation; software development and lifecycle management; virtual classroom education delivery; data analytics processing; and transaction processing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 4:
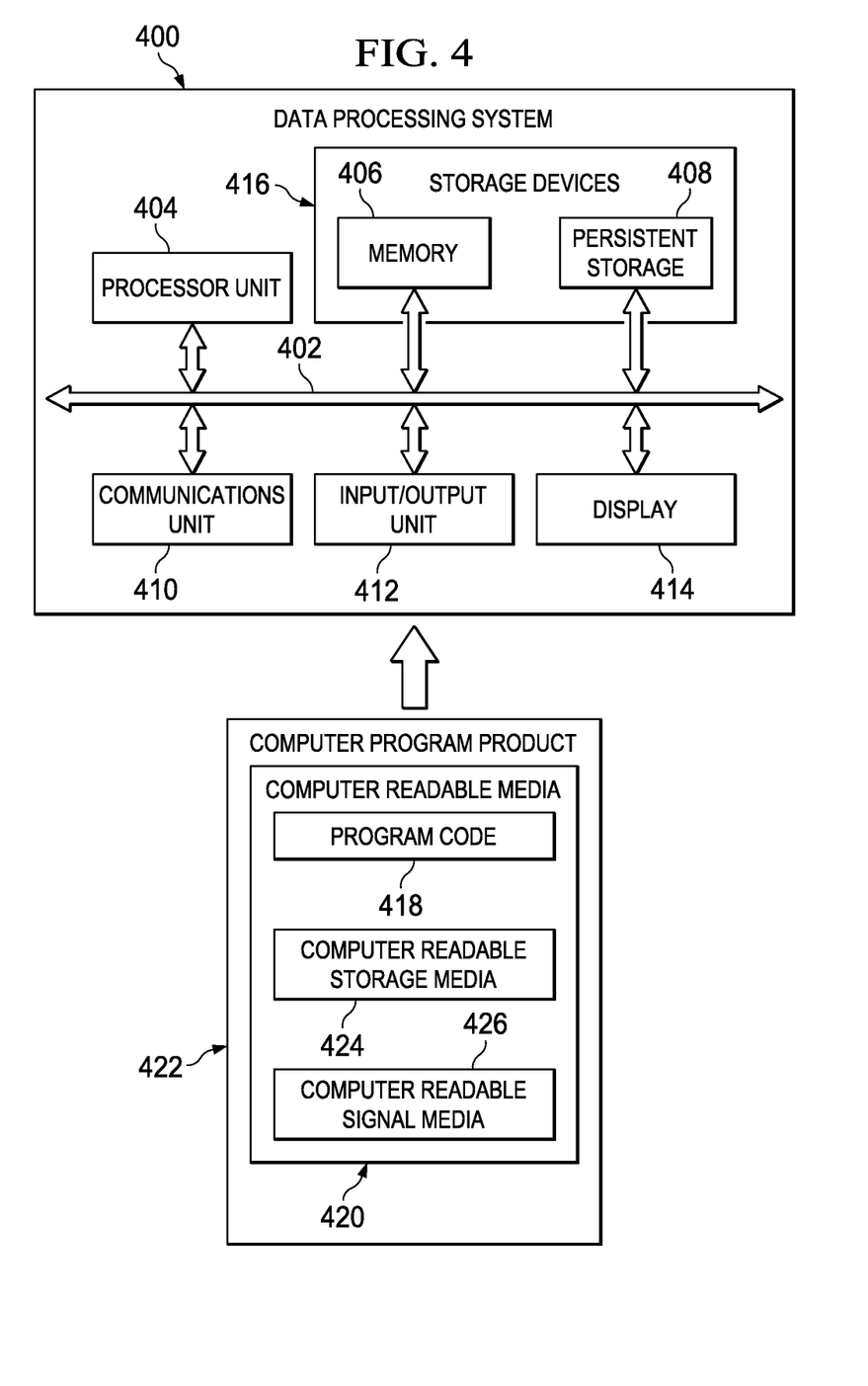

Turning now to FIG. 4, an illustration of a data processing system is depicted in accordance with an illustrative embodiment. Data processing system 4100 may be used to implement a cloud computing environment such as cloud computing environment 250 of FIG. 2. In this illustrative example, data processing system 400 includes communications framework 402, which provides communications between processor unit 404, memory 406, persistent storage 408, communications unit 410, input/output (I/O) unit 412, and display 414. In these examples, communications framework 404 may be a bus system.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications framework 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400. In these examples, computer readable storage media 424 is a physical or tangible storage device used to store program code 418 rather than a medium that propagates or transmits program code 418. Computer readable storage media 424 is also referred to as a computer readable tangible storage device or a computer readable physical storage device. In other words, computer readable storage media 424 is a media that can be touched by a person.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

In another example, a bus system may be used to implement communications framework 402 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 406, or a cache, such as found in an interface and memory controller hub that may be present in communications framework 402.

Monitoring of virtual resources such as CPU usage, memory usage, and network usage in cloud infrastructures is currently performed by legacy monitoring systems that have been altered to run in the cloud environment. The alterations make the legacy monitoring systems aware of both the physical resources and virtual resources, enabling monitoring within the cloud environment.

However, the legacy monitoring systems have not addressed several problems inherent in applying the legacy system to the virtual environment of the cloud system. For example, when utilizing a centralized legacy monitoring system, such as IBM Tivoli, Amazon CloudWatch, and VMWare vFabric, monitoring is tight to the infrastructure. Therefore, it is not possible to take the monitoring data to a new infrastructure in the event of a migration. IP and MAC addresses that are currently used as identifiers for network recurses are too volatile in cloud infrastructures. Therefore, keeping track of virtual recourses is challenging, especially for network related resources. Furthermore, the cloning of any pedigree of monitoring data, such as cloned images having monitoring history and which is required for Virtual Machine placement purposes, is not possible or it can be very challenging when utilizing a centralized legacy monitoring system.

Additionally, when utilizing a legacy monitoring system located within a virtual machine, such as monitoring provided by Amazon third party monitoring companies, monitoring is limited to only those resources that can be seen by the virtual machine. Monitoring data are not accessible by cloud infrastructure, and they are not trustworthy to be used for billing purposes for example. Furthermore, monitoring data are not available when Virtual Machines are not running.

The illustrative embodiments described herein provide a method for storing monitoring data that avoids the problems inherent to legacy monitoring systems. Monitoring data are stored in combination with the virtual resources, such as, for example, but not limited to, any name or identifying description assigned to the virtual machine, an amount of memory requested by the virtual machine, and a number of virtual processor units required by the virtual machine. Anytime that the same virtual machine is instantiated (or migrated), additional monitoring data is appended to monitoring data previously collected. The measurement configuration information, which identify the resources of a virtual machine that are monitored, can be stored as metadata of the virtual machine as well.

Additionally, for composite applications, associated measurement data is stored in addition to all other metadata that define the composite applications. In one illustrative embodiment, the associated measurement data for composite applications is stored in an open virtualization format (.OVF) file. Moreover, the measurement configuration information, which identify the resources of a composite application that are monitored, can be stored as metadata of the virtual machine as well. In one illustrative embodiment, the associated measurement configuration information for composite applications is stored in an open virtualization format (.OVF) file.

By storing monitoring data in combination with the virtual resources, monitoring environments do not have to make associations during migration of virtual machines or during configuration changes to applications executing within the virtual machine. Thus, in contrast to traditional centralized monitoring systems, there is no need to track changes virtual machine identifiers, such as IP & MAC addresses of the virtual machines. Additionally, there is no need to maintain associations between monitoring data, virtual machine identifiers and the virtual machines. As such, the methods described herein do not require cooperation between hypervisors and the monitoring system.

By storing monitoring data in combination with the virtual resources, monitoring data are maintained even if the virtual machines or composite applications migrate to different cloud environments. Monitoring data can be cloned when the virtual machines or composite appliances are used in a template-like format for the creation of other virtual resources. Furthermore, monitoring data can be combined when more than one different composite applications are merged.

Additionally, storing monitoring data in combination with the virtual resources allows the automated population of monitoring data for cloned virtual machine images. Storing monitoring data in combination with the virtual resources enables the conservation of monitoring data when moving virtual machines between cloud infrastructures, such as between private and public clouds). Furthermore, the methods described herein make possible the accessing of monitoring data even when a virtual machine is suspended and stored in an image software library.

Furthermore, the illustrative embodiments prevent an image owner to temper with the monitoring data. Prevention of data tampering is an essential requirement when such data are used for billing purposes.

In one illustrative embodiment, the methods described here work with a centralized monitoring software. In another illustrative embodiment, the methods described here work with an extension on the hypervisor itself.

Thus, illustrative embodiments of the present invention provide a computer implemented method for monitoring resource usage of a virtual machine. When a virtual machine is instantiated, resource usage of the virtual machine is monitored to form monitoring data. The monitoring is performed externally from the virtual machine. When the virtual machine is later suspended, the monitoring data is stored as metadata associated with the virtual machine.

Figure 5:
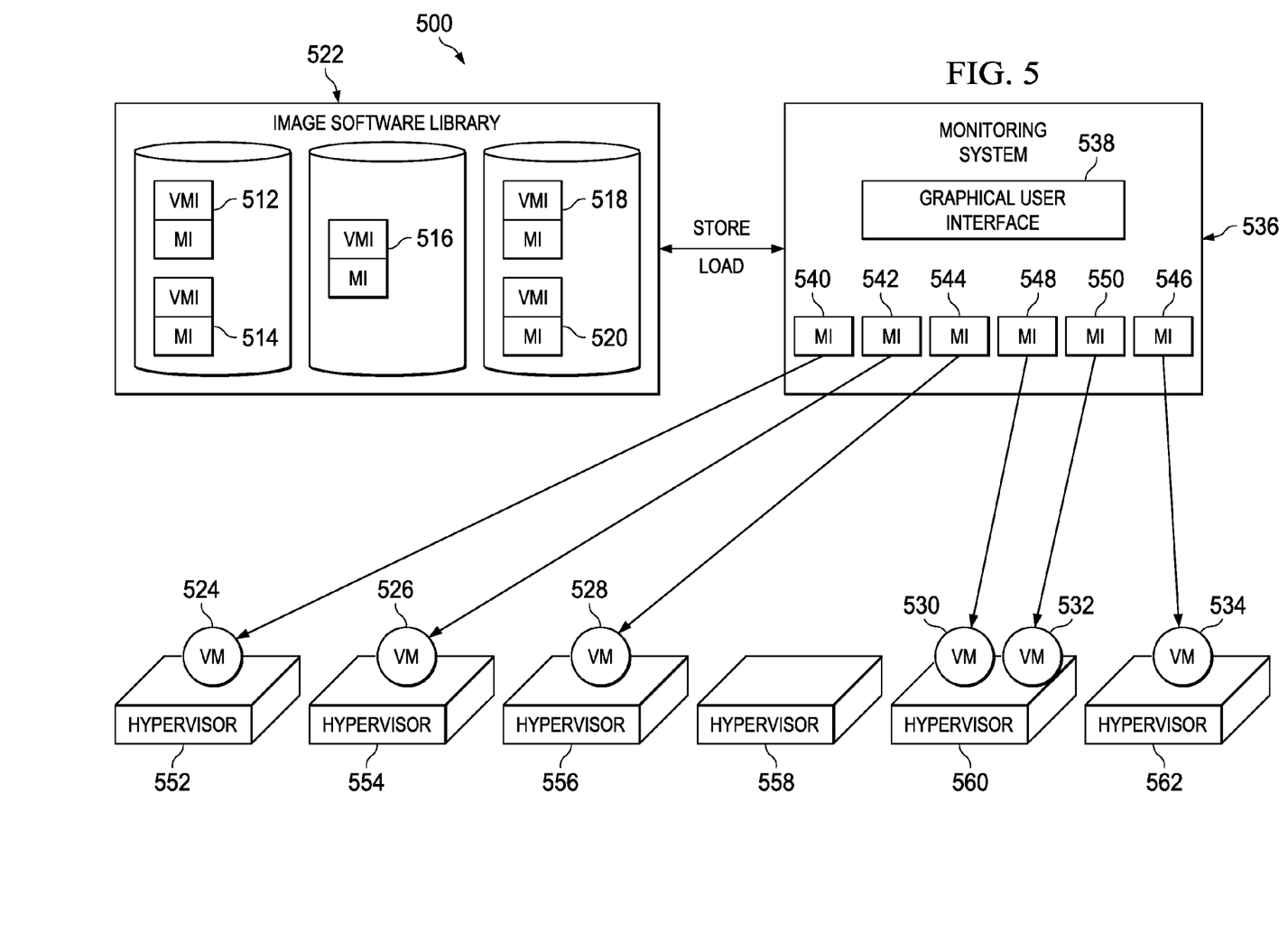
FIG. 5 is a data flow for storing virtual machine monitoring data in a centralized monitoring application in accordance with an illustrative embodiment.

Referring now to FIG. 5, a data flow is shown for storing virtual machine monitoring data in a centralized monitoring application, according to an illustrative embodiment. Cloud computing environment 500 is a cloud computing environment such as cloud computing environment 250 of FIG. 2.

Virtual machine image 512, 514, 516, 518, and 520 are stored in image software library 522. Image software library 522 is a collection of virtual machine images, such as virtual machine image 512, 514, 516, 518, and 520 that can be provisioned to create a virtual machine. Image software library 522 can be stored, for example, within a hardware and software layer of a cloud computing environment, such as hardware and software layer 360 of FIG. 3. Each of virtual machine images 512, 514, 516, 518, and 520 is a set of files that are used to run one or more of virtual machine 524, 526, 528, 530, 532, and 534. Each of virtual machine images 512, 514, 516, 518, and 520 includes files to act as disk storage, a virtual machine definition, and various other files that are by a hypervisor. Each of virtual machines 524, 526, 528, 530, 532, and 534 is managed by one of hypervisors 552, 554, 556, 558, 560, or 562.

The virtual machine definition is a template file consisting of a set of attributes that defines a Virtual Machine. The attributes can include, for example, any name or identifying description assigned to the virtual machine, an amount of memory requested by the virtual machine, and a number of virtual processor units required by the virtual machine. Additionally, the virtual machine definition can include disks of a virtual machine, network interfaces of a virtual machine, input/output interfaces, any placement constraints and preferences for the virtual machine, as well as any context of the virtual machine including files, disk images, or variables utilized by the virtual machine.

When the hypervisor provisions a virtual machine, the hypervisor first reads the virtual machine definition to determine the attributes for that virtual machine. The hypervisor then provisions the virtual machine according to the virtual machine definition.

Monitoring system 536 is a component that monitors resources usage, such as CPU usage, memory usage, and network usage of virtual machine 524, 526, 528, 530, 532, and 534 in cloud computing environment 500. In one illustrative embodiment of cloud computing environment 500, monitoring system 536 is a centralized monitoring software. Monitoring system 536 includes graphical user interface 538. Graphical user interface 538 is an interface that allows interaction with monitoring system 536. Monitoring system 536 can be implemented in a management layer of a cloud computing environment, such as management layer 364 of FIG. 3. In one illustrative embodiment of cloud computing environment 500, monitoring system 536 is a centralized monitoring hardware within a hardware and software layer of a cloud computing environment, such as hardware and software layer 360 of FIG. 3.

Monitoring system 536 collects monitoring information 540, 542, 544, 546, 548, and 550 from each of virtual machine 524, 526, 528, 530, 532, and 534, so long as the corresponding virtual machine is running That is, monitoring system 536 collects monitoring information 540 from virtual machine 524 when virtual machine 524 is running Monitoring system 536 collects monitoring information 542 from virtual machine 526 when virtual machine 526 is running Monitoring system 536 collects monitoring information 544 from virtual machine 528 when virtual machine 528 is running Monitoring system 536 collects monitoring information 546 from virtual machine 530 when virtual machine 530 is running Monitoring system 536 collects monitoring information 548 from virtual machine 532 when virtual machine 532 is running. Monitoring system 536 collects monitoring information 550 from virtual machine 534 when virtual machine 534 is running.

Whenever the state of one of virtual machine 524, 526, 528, 530, 532, and 534 changes from running to paused or halted, or when a Virtual Machine snapshot is requested, then monitoring information related to the virtual machine are formatted appropriately and get attached as metadata of the associated virtual machine. If previous monitoring information is already associated with the virtual machine, then the newly collected monitoring information is appended to the existing monitoring information. That is, when virtual machine 524 is paused, halted, or when a snapshot of virtual machine 524 is requested, monitoring information 540 is formatted and attached as metadata to virtual machine image 512. When virtual machine 526 is paused, halted, or when a snapshot of virtual machine 526 is requested, monitoring information 542 is formatted and attached as metadata to virtual machine image 514. When virtual machine 528 is paused, halted, or when a snapshot of virtual machine 528 is requested, monitoring information 544 is formatted and attached as metadata to virtual machine image 516. When virtual machine 530 is paused, halted, or when a snapshot of virtual machine 530 is requested, monitoring information 546 is formatted and attached as metadata to virtual machine image 518. When virtual machine 532 is paused, halted, or when a snapshot of virtual machine 532 is requested, monitoring information 548 is formatted and attached as metadata to virtual machine image 520. When virtual machine 534 is paused, halted, or when a snapshot of virtual machine 534 is requested, monitoring information 550 is formatted and attached as metadata to virtual machine image 522.

Extending the above approach to composite appliances, whenever there is a configuration or state change in the composite appliance the related monitoring data are attached to the composite appliance as additional metadata.

Attaching to the virtual machine or composite appliance as additional metadata requires graphical user interface 538 between the monitoring system 536 and image software library 522. Utilizing graphical user interface 538, image software library 522 calls to the monitoring system 536 when the status of a composite application of virtual machine changes from running to suspended, in order to receive all the monitoring data collected. Graphical user interface 538 then appends the monitoring data to the existing virtual machine or composite application as metadata. Afterward, when the status of the virtual machine composite application changes from suspended to running, image software library 522 calls monitoring system 536 and instructs monitoring system 536 to resume monitoring of the running virtual machine.

Figure 6:
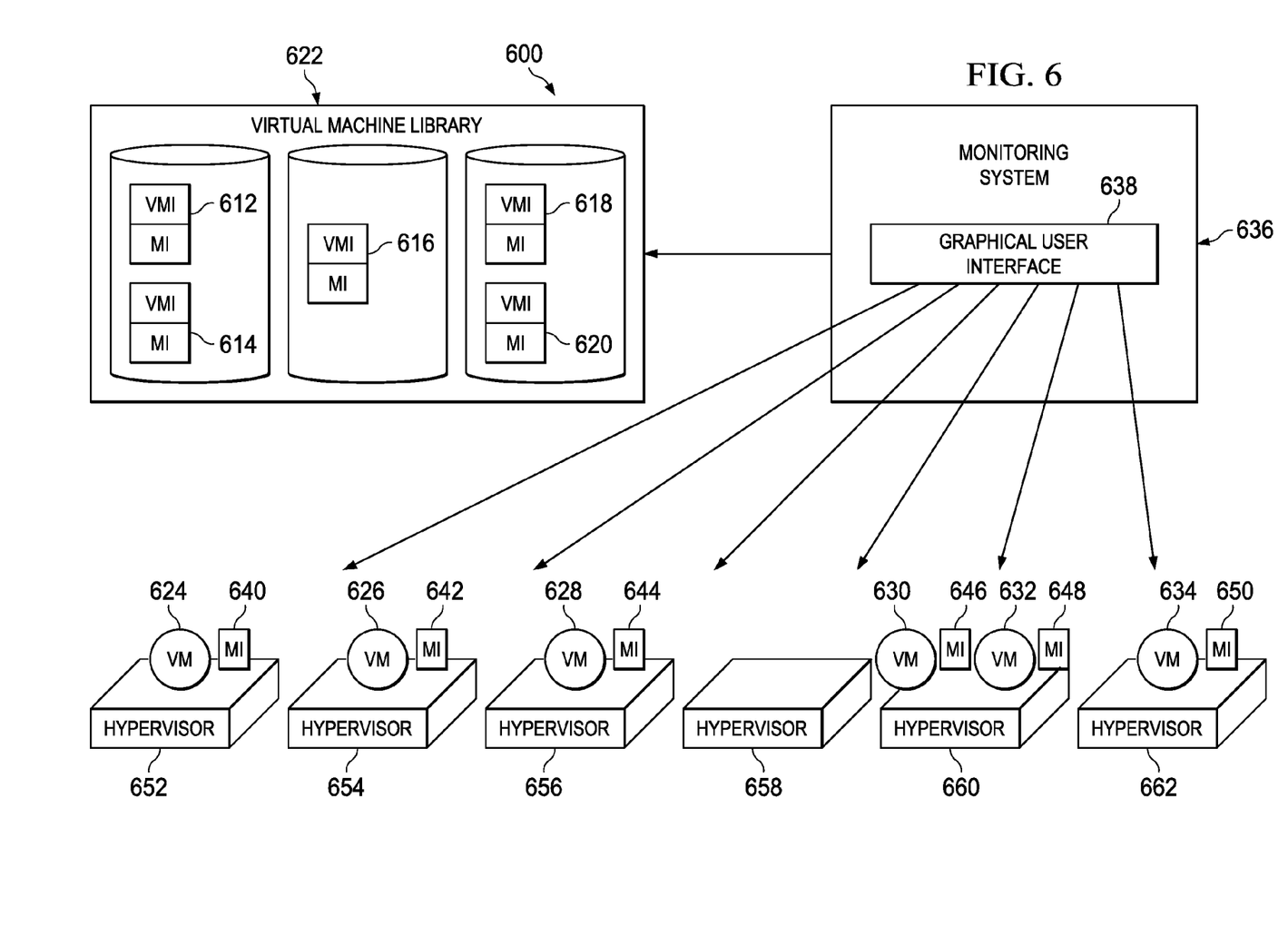
FIG. 6 is a data flow for storing virtual machine monitoring data in a hypervisor monitoring application in accordance with an illustrative embodiment.

Referring now to FIG. 6, a data flow is shown for storing virtual machine monitoring data in a hypervisor monitoring application, according to an illustrative embodiment. Cloud computing environment 600 is a cloud computing environment such as cloud computing environment 250 of FIG. 2.

Virtual machine image 612, 614, 616, 618, and 620 are stored in image software library 622. Image software library 622 is a collection of virtual machine images, such as virtual machine image 612, 614, 616, 618, and 620 that can be provisioned to create a virtual machine. Each of virtual machine images 612, 614, 616, 618, and 620 is a set of files that are used to run or more of virtual machine 624, 626, 628, 630, 632, and 634. Each of virtual machine images 612, 614, 616, 618, and 620 includes files to act as disk storage, a virtual machine definition, and various other files that are by a hypervisor. Each of virtual machine 624, 626, 628, 630, 632, and 634 is managed by one of hypervisors 652, 654, 656, 658, 660, or 662.

When a hypervisor, such as one of hypervisors 652, 654, 656, 658, 660, or 662, provisions a virtual machine, the hypervisor first reads the virtual machine definition to determine the attributes for that virtual machine. The hypervisor then provisions the virtual machine according to the virtual machine definition.

Monitoring system 636 is a software component that monitors resources usage, such as CPU usage, memory usage, and network usage of virtual machine 624, 626, 628, 630, 632, and 634 in cloud computing environment 600. Monitoring system 636 includes graphical user interface 638. Graphical user interface 638 is an interface that allows interaction with monitoring system 636. Each of virtual machine 624, 626, 628, 630, 632, and 634 is managed by one of hypervisors 652, 654, 656, 658, 660, or 662.

Each of virtual machine 624, 626, 628, 630, 632, and 634 collects monitoring information 640, 642, 644, 646, 648, and 650 for monitoring system 636, so long as the corresponding virtual machine is running. That is, virtual machine 624 collects monitoring information 640 from virtual machine 624 when virtual machine 624 is running Virtual machine 626 collects monitoring information 642 from virtual machine 626 when virtual machine 626 is running Virtual machine 628 collects monitoring information 644 from virtual machine 628 when virtual machine 628 is running. Virtual machine 630 collects monitoring information 646 from virtual machine 630 when virtual machine 630 is running. Virtual machine 632 collects monitoring information 648 from virtual machine 632 when virtual machine 632 is running. Virtual machine 634 collects monitoring information 650 from virtual machine 634 when virtual machine 634 is running.

Each of hypervisors 652, 654, 656, 658, 660, and 662 has a number of software capabilities that enable it to become a monitoring proxy for the virtual machines that it hosts. That is, hypervisor 652 is a monitoring proxy for virtual machine 624. Hypervisor 654 is a monitoring proxy for virtual machine 626. Hypervisor 656 is a monitoring proxy for virtual machine 628. Hypervisor 660 is a monitoring proxy for both virtual machine 630 and virtual machine 632. Hypervisor 662 is a monitoring proxy for virtual machine 634.

In an illustrative embodiment, each of hypervisors 652, 654, 656, 658, 660, and 662 has the capability to measure, for example, but not limited to, the CPU utilization of individual virtual machines, the in/out packets from the virtual network interface cards, and the pair-wise flows between virtual machines that go through the hypervisor. Additionally, each of hypervisors 652, 654, 656, 658, 660, and 662 can optionally act as a monitoring manager for the various agents that may run on its hosted virtual machines. For example, each of hypervisors 652, 654, 656, 658, 660, and 662 is capable of collecting measurements from SNMP agents of the virtual machines. Furthermore, each of hypervisors 652, 654, 656, 658, 660, and 662 is capable of dynamically configuring its measurement probes based on monitoring requirements.

Once hypervisors 652, 654, 656, 658, 660, and 662 receive the monitoring requirements for a virtual machine, the hypervisor starts collecting monitoring information 640, 642, 644, 646, 648, and 650 of the requested metrics. Each of monitoring information 640, 642, 644, 646, 648, and 650 is then attached respectively to virtual machine 624, 626, 628, 630, 632, and 634 as additional metadata.

As the number of virtual machines per hypervisor increases, the illustrative embodiment having hypervisor support can easily scale to meet demand. No monitoring data need flow out of the physical server. Furthermore, because monitoring decisions are done locally, those decisions become more accurate when the frequency of virtual machine instantiations increases.

Figure 7:
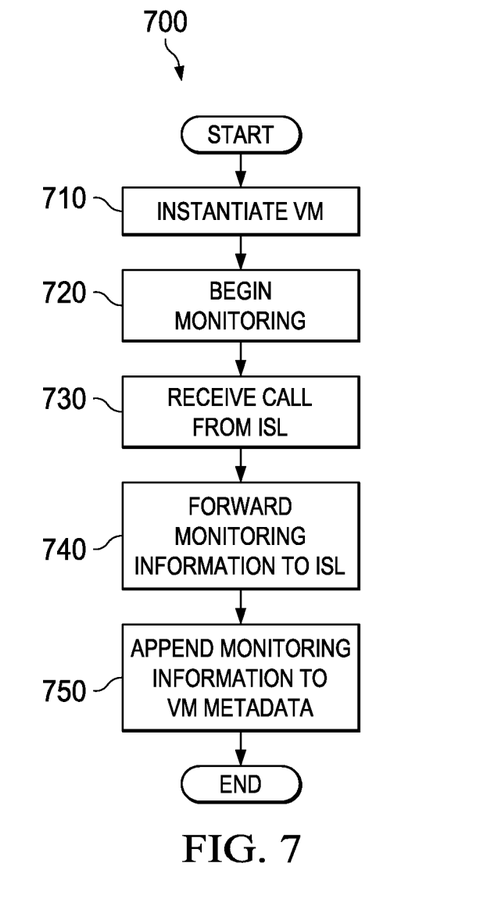
FIG. 7 is a flowchart for storing virtual machine monitoring data in a centralized monitoring application in accordance with an illustrative embodiment.

Referring now to FIG. 7, a flowchart for storing virtual machine monitoring data in a centralized monitoring application is shown according to an illustrative embodiment. Process 700 is a software process executing in a cloud computing environment, such as within monitoring system 536 of cloud computing environment 500 of FIG. 5.

Process 700 begins by instantiating a virtual machine (step 710). Process 700 then beings monitoring the virtual machine (step 720).

Process 600 receives a call from a image software library (step 730). The image library can be, for example, image software library 722. The call can be a call to pause, halt, suspend or request a snapshot of a virtual machine within a cloud computing environment.

Responsive to receiving the call, monitoring information is forwarded to the image software library (step 740). The monitoring information can be, for example, monitoring information 540, 542, 544, 546, 548, and 550 of FIG. 5.

Process 700 then appends the monitoring information to the virtual machine as metadata (step 750), with the process terminating thereafter. In the case of a virtual machine, the monitoring information can be stored in the virtual machine definition. In the case of a composite service, the monitoring information can be stored in an open virtualization format (.OVF) file for the composite service.

Figure 8:
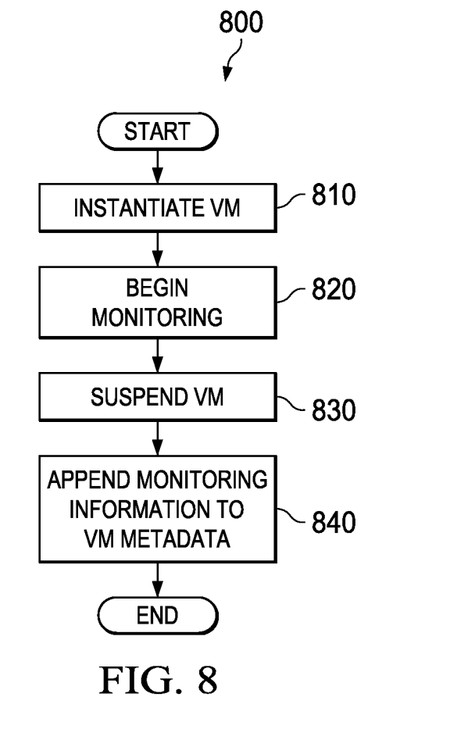
FIG. 8 is a flowchart for storing virtual machine monitoring data in a hypervisor supported monitoring application in accordance with an illustrative embodiment.

Referring now to FIG. 8, a flowchart for storing virtual machine monitoring data in a hypervisor supported monitoring application is shown according to an illustrative embodiment. Process 800 is a software process executing in a cloud computing environment, such as within monitoring system 636 of cloud computing environment 600 of FIG. 6.

Process 800 begins by instantiating a virtual machine (step 810). Process 800 then beings monitoring the virtual machine (step 820).

Process 800 then pauses, halts, suspends or requests a snapshot of a virtual machine (step 830). The image software library can be, for example, image software library 822. The call can be a call to within a cloud computing environment.

Responsive to pausing, halting, suspending or requesting a snapshot of a virtual machine, process 800 appends the monitoring information to the virtual machine as metadata (step 840), with the process terminating thereafter. In the case of a virtual machine, the monitoring information can be stored in the virtual machine definition. In the case of a composite service, the monitoring information can be stored in an open virtualization format (.OVF) file for the composite service.

The illustrative embodiments described herein provide a method for storing monitoring data that avoids the problems inherent to legacy monitoring systems. Monitoring data are stored in combination with the virtual resources, such as, for example, but not limited to, any name or identifying description assigned to the virtual machine, an amount of memory requested by the virtual machine, and a number of virtual processor units required by the virtual machine. Anytime that the same virtual machine is instantiated (or migrated), additional monitoring data is appended to monitoring data previously collected.

Additionally, for composite applications, associated measurement data is stored in addition to all other metadata that define the composite applications. In one illustrative embodiment, the associated measurement data for composite applications is stored in an open virtualization format (.OVF) file.

By storing monitoring data in combination with the virtual resources, monitoring environments do not have to make associations during migration of virtual machines or during configuration changes to applications executing within the virtual machine. Thus, in contrast to traditional centralized monitoring systems, there is no need to track changes virtual machine identifiers, such as IP & MAC addresses of the virtual machines. Additionally, there is no need to maintain associations between monitoring data, virtual machine identifiers and the virtual machines. As such, the methods described herein do not require cooperation between hypervisors and the monitoring system.

By storing monitoring data in combination with the virtual resources, monitoring data are maintained even if the virtual machines or composite applications migrate to different cloud environments. Monitoring data can be cloned when the virtual machines or composite appliances are used in a template-like format for the creation of other virtual resources. Furthermore, monitoring data can be combined when more than one different composite applications are merged.

Additionally, storing monitoring data in combination with the virtual resources allows the automated population of monitoring data for cloned virtual machine images. Storing monitoring data in combination with the virtual resources enables the conservation of monitoring data when moving virtual machines between cloud infrastructures, such as between private and public clouds. Furthermore, the methods described herein make possible the accessing of monitoring data even when a virtual machine is suspended and stored in an image software library.

Furthermore, the illustrative embodiments prevent an image owner, i.e. an infrastructure as a service customer, to temper with the monitoring data. Prevention of data tampering is an essential requirement when such data are used for billing purposes. In one illustrative embodiment, the methods described here work with a centralized monitoring software. In another illustrative embodiment, the methods described here work with an extension on the hypervisor itself. Additionally, known cryptographic techniques can be employed in order to make tampering of monitoring data more difficult. For example, the whenever new monitoring data is appended as metadata related to the virtual machine, those data or a signature of the data get signed by a private key owned by the cloud infrastructure. Signing of the data can be performed either by the centralized monitoring system, the hypervisor itself or the image library Thus, illustrative embodiments of the present invention provide a computer implemented method for monitoring resource usage of a virtual machine. When a virtual machine is instantiated, resource usage of the virtual machine is monitored to form monitoring data. The monitoring is performed externally from the virtual machine. When the virtual machine is later suspended, the monitoring data is stored as metadata associated with the virtual machine.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for monitoring resource usage of a virtual machine, the method comprising:
   instantiating, by a processor unit, the virtual machine;
   monitoring, by the processor unit, resource usage of the virtual machine to form monitoring data, wherein the monitoring is performed externally from the virtual machine by a hypervisor having capabilities of a monitoring proxy for virtual machines that it hosts;

suspending, by the processor unit, the virtual machine;

responsive to suspending the virtual machine, formatting and storing, by the processor unit, the monitoring data appended by the hypervisor specifically as metadata attached to a virtual machine image in combination with virtual resources associated with the virtual machine in an image software library, obviating a requirement in monitoring environments to make associations during migration of virtual machines and during configuration changes to applications executing within the virtual machine by maintaining associations between the monitoring data, virtual machine identifiers and virtual machines tracking changes in the virtual machine identifiers, including Internet Protocol IP addresses and media access control addresses of the virtual machine;

maintaining the monitoring data as the metadata when one of the virtual machine, or a composite application, migrates to a different cloud environment and when moving the virtual machine between cloud infrastructures including a private cloud and a public cloud; and accessing the monitoring data as the metadata while the virtual machine is suspended and stored in the image software library and enabling automated population of monitoring data for cloned virtual machine images.

2. The computer implemented method of claim 1, wherein the monitoring data is first monitoring data, the method further comprising:

restarting, by the processor unit, the virtual machine; and monitoring, by the processor unit, after a restart of the virtual machine, resource usage of the virtual machine to form second monitoring data, wherein the monitoring is performed externally from the virtual machine by the hypervisor.

3. The computer implemented method of claim 2, the method further comprising:

appending, by the processor unit, the second monitoring data to the first monitoring data as additional metadata, wherein the appending is performed by the hypervisor.

4. The computer implemented method of claim 3, wherein the step of monitoring resource usage of the virtual machine to form the first monitoring data is performed within a first cloud environment, and wherein the step of restarting the virtual machine further comprises:

migrating, by the processor unit, the virtual machine and the metadata attached to the virtual machine image to a new cloud environment; and restarting, by the processor unit, the virtual machine in the new cloud environment.

5. The computer implemented method of claim 4, wherein monitoring resource usage of the virtual machine to form second monitoring data is performed within a second cloud environment, the method further comprising:

appending, by the processor unit, the second monitoring data generated within the second cloud environment to the first monitoring data generated within the first cloud environment as the additional metadata, wherein the appending is performed by the hypervisor.

6. The computer implemented method of claim 3, wherein the virtual machine is a first virtual machine, and wherein the step of monitoring resource usage of the virtual machine to form monitoring data further comprises:

monitoring, by the processor unit, resource usage of the first virtual machine to form the second monitoring data, wherein the monitoring is performed by a monitoring system executing in a second virtual machine, wherein an interface is defined between the first virtual machine and the second virtual machine.

7. The computer implemented method of claim 6, wherein the step of suspending the first virtual machine further comprises:

receiving, by the processor unit, a call from the image software library of the first virtual machine by the monitoring system;

responsive to receiving the call from the image software library of the first virtual machine by the monitoring system, forwarding, by the processor unit, the first monitoring data from the monitoring system to the image software library; and appending, by the processor unit, the first monitoring data as the metadata to existing metadata associated with the first virtual machine as the additional metadata, wherein the appending is performed by the hypervisor.

8. The computer implemented method of claim 6, wherein the step of restarting the first virtual machine further comprises:

receiving, by the processor unit, a call from the image software library of the first virtual machine by the monitoring system, wherein the call from the image software library of the first virtual machine instructs the monitoring system to begin collecting the second monitoring data.

9. The computer implemented method of claim 6, wherein the step of monitoring resource usage of the virtual machine to form monitoring data further comprises:

monitoring, by the processor unit, resource usage of the virtual machine to form the second monitoring data, wherein the monitoring is performed by the hypervisor, and wherein the hypervisor and a monitoring system operate independently.

10. The computer implemented method of claim 7, wherein the step of suspending the first virtual machine further comprises:

suspending, by the processor unit, the first virtual machine by the hypervisor; and appending, by the processor unit, the first monitoring data as the metadata to the existing metadata associated with the first virtual machine, as the additional metadata, and wherein the appending is performed by the hypervisor.

11. The computer implemented method of claim 10 further comprising:

receiving, by the processor unit, a set of monitoring requirements for the first virtual machine, wherein the set of monitoring requirements is received by the hypervisor;

monitoring, by the processor unit, the resource usage of the first virtual machine according to the set of monitoring requirements for the first virtual machine to form the first monitoring data; and appending, by the processor unit, the first monitoring data as the metadata to the existing metadata associated with the first virtual machine, as the additional metadata, and wherein the appending is performed by the hypervisor.

* * * * *